US012681134B2

(12) United States Patent
Hirano

(10) Patent No.: US 12,681,134 B2
(45) Date of Patent: Jul. 14, 2026

(54) SENSOR SYSTEM

(71) Applicant: FUJI CORPORATION, Chiryu (JP)

(72) Inventor: Atsunori Hirano, Toyota (JP)

(73) Assignee: FUJI CORPORATION, Chiryu (JP)

( * ) Notice: Subject to any disclaimer, the term of this patent is extended or adjusted under 35 U.S.C. 154(b) by 386 days.

(21) Appl. No.: 18/248,820

(22) PCT Filed: Oct. 13, 2020

(86) PCT No.: PCT/JP2020/038634
§ 371 (c)(1),
(2) Date: Apr. 12, 2023

(87) PCT Pub. No.: WO2022/079806
PCT Pub. Date: Apr. 21, 2022

(65) Prior Publication Data
US 2023/0408634 A1     Dec. 21, 2023

(51) Int. Cl.
G01S 7/02 (2006.01)

(52) U.S. Cl.
CPC .......... G01S 7/0235 (2021.05); G01S 7/0232 (2021.05)

(58) Field of Classification Search
CPC .... G01S 7/0235; G01S 7/0232; G01S 13/881; G01S 13/87; G01S 13/88; G01S 13/345; G06K 7/10; G06K 7/10366; G06K 7/10376; H05K 13/08; H05K 13/0812; H05K 13/082; G06F 13/4247
See application file for complete search history.

(56) References Cited

U.S. PATENT DOCUMENTS

| | | | | | |
|---|---|---|---|---|---|
| 7,882,289 B2 * | 2/2011 | Furuya | ................ | G06F 13/4247 |
| | | | | | 710/110 |
| 2007/0200747 A1 | 8/2007 | Okai et al. | | | |
| 2008/0106458 A1 * | 5/2008 | Honda | .................... | G01S 7/023 |
| | | | | | 342/59 |
| 2016/0061935 A1 | 3/2016 | Mccloskey et al. | | | |
| 2018/0242485 A1 * | 8/2018 | Kondo | .............. | H05K 13/0473 |
| 2019/0391247 A1 * | 12/2019 | Gulati | .................... | G01S 13/341 |
| 2021/0239787 A1 * | 8/2021 | Li | .......................... | G01S 13/343 |

FOREIGN PATENT DOCUMENTS

| | | | |
|---|---|---|---|
| JP | 2002-323572 A | | 11/2002 |
| JP | 2007-232498 A | | 9/2007 |
| JP | 2010203918 A | * | 9/2010 |
| JP | 2011-232045 A | | 11/2011 |
| JP | 2019-12079 A | | 1/2019 |

OTHER PUBLICATIONS

International Search report issued Nov. 24, 2020 in PCT/JP2020/038634 filed on Oct. 13, 2020 3 pages.

* cited by examiner

*Primary Examiner* — Resha Desai
*Assistant Examiner* — Naomi M Wolford
(74) *Attorney, Agent, or Firm* — Oblon, McClelland, Maier & Neustadt, L.L.P.

(57) ABSTRACT

A sensor system, which includes multiple sensors configured to transmit and receive continuous waves of frequency-modulated chirp signals by using radio waves, includes a storage section that stores multiple chirp patterns having different patterns of the chirp signals, and a setting section that selects a different chirp pattern for each sensor from the multiple chirp patterns and sets the selected chirp pattern in association with the sensor.

5 Claims, 8 Drawing Sheets

Figure 4:
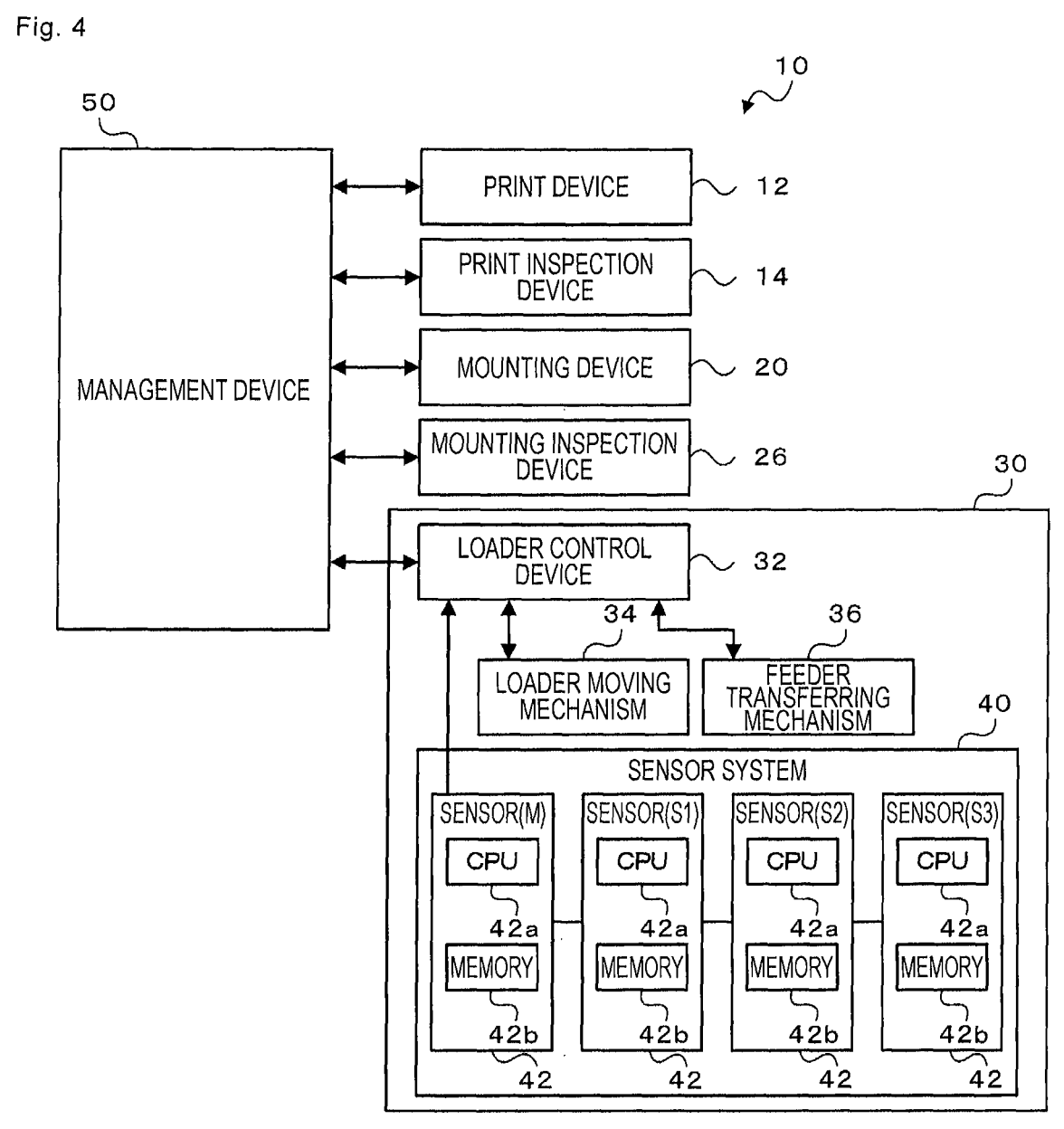

MANAGEMENT DEVICE

PRINT DEVICE ～ 12

PRINT INSPECTION DEVICE ～ 14

MOUNTING DEVICE ～ 20

MOUNTING INSPECTION DEVICE ～ 26

30

LOADER CONTROL DEVICE ～ 32

34

36

LOADER MOVING MECHANISM

FEEDER TRANSFERRING MECHANISM

40

SENSOR SYSTEM

| SENSOR(M) | SENSOR(S1) | SENSOR(S2) | SENSOR(S3) |
|---|---|---|---|
| CPU | CPU | CPU | CPU |
| 42a | 42a | 42a | 42a |
| MEMORY | MEMORY | MEMORY | MEMORY |
| 42b | 42b | 42b | 42b |
| 42 | 42 | 42 | 42 |

CL

| CHIRP PATTERN PN (N: SERIAL NUMBER) | CHIRP INCLINATION $\theta$ |
|---|---|
| P 1 | $\theta 1$ |
| P 2 | $\theta 2$ |
| P 3 | $\theta 3$ |
| P 4 | $\theta 4$ |
| P 5 | $\theta 5$ |
| P 6 | $\theta 6$ |
| P 7 | $\theta 7$ |
| P 8 | $\theta 8$ |
| P 9 | $\theta 9$ |
| ⋮ | ⋮ |

40(40B)

SENSOR SYSTEM

TECHNICAL FIELD

The present specification discloses a sensor system.

BACKGROUND ART

There has been proposed a sensor system including a sensor that transmits a radio wave of a signal based on a modulation pattern having a frequency that is continuously modulated, receives a radio wave reflected by an object, and senses a distance to the object or the like (refer to, for example, Patent Literature 1). In this system, multiple sensors transmit radio waves based on different modulation patterns to distinguish waveforms from each other, and thereby, interference with another sensor is prevented.

PATENT LITERATURE

Patent Literature 1: JP-A-2019-012079

BRIEF SUMMARY

Technical Problem

The setting of the different modulation patterns described above needs to be performed not only when multiple sensors are installed, but also when a sensor is added after the sensors are installed. In this case, in order for a worker to perform a setting work of the modulation pattern, the work is time consuming and troublesome. Particularly, when a sensor is added, the worker acquires modulation patterns of respective sensors that are previously installed and performs setting of a modulation pattern different from the acquired modulation patterns, and thus, work burden increases.

A main object of the present disclosure is to easily prevent radio wave interference between multiple sensors of a frequency modulation continuous wave method so as to obtain normal detection results from respective sensors.

Solution to Problem

The present disclosure employs following means to achieve the main object described above.

A sensor system of the present disclosure includes multiple sensors configured to transmit and receive continuous waves of frequency-modulated chirp signals by using radio waves, and includes a storage section that stores multiple chirp patterns having different patterns of the chirp signals, and a setting section that selects different chirp patterns for each sensor from the multiple chirp patterns and setting the selected chirp patterns in association with the sensor.

A sensor system of the present disclosure selects a different chirp pattern for each sensor from multiple chirp patterns in which patterns of chirp signals are different from each other and sets the selected chirp pattern in association with the sensor. Therefore, a worker need not select and set a chirp pattern for each sensor, and thus, a setting work of the sensor system can be easily performed. Further, each sensor transmits and receives radio waves based on chirp signals having different chirp patterns, and thus, a possibility of radio wave interference due to duplicate frequencies of the chirp signals can be reduced. Thus, radio wave interference between the multiple sensors is easily prevented to obtain a normal detection result from each sensor.

BRIEF DESCRIPTION OF DRAWINGS

FIG. 4 is a block diagram illustrating a configuration related to a control of mounting system 10.

DESCRIPTION OF EMBODIMENTS

Figure 1:
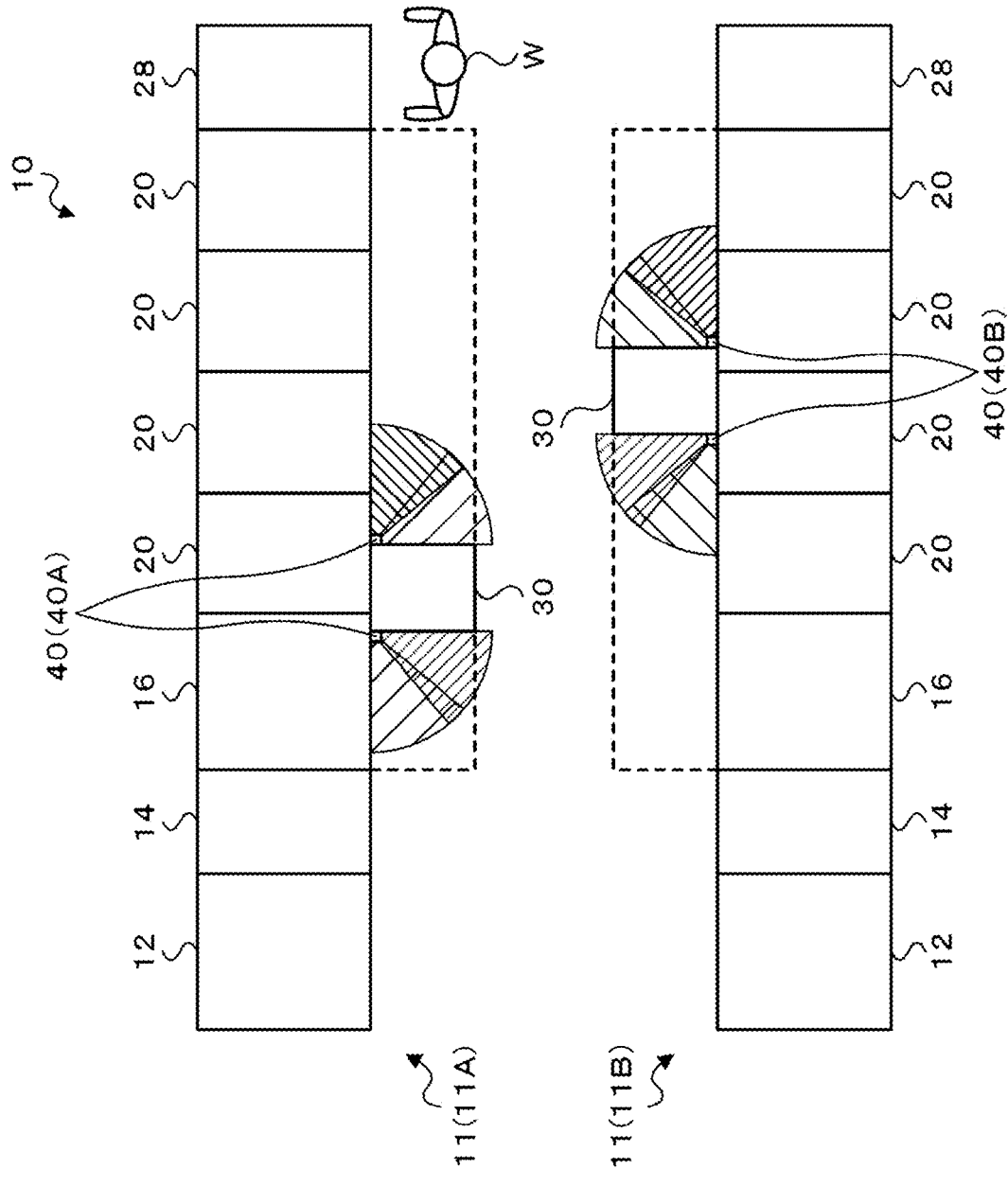
FIG. 1 is an explanatory diagram illustrating an example of mounting system 10.
Figure 2:
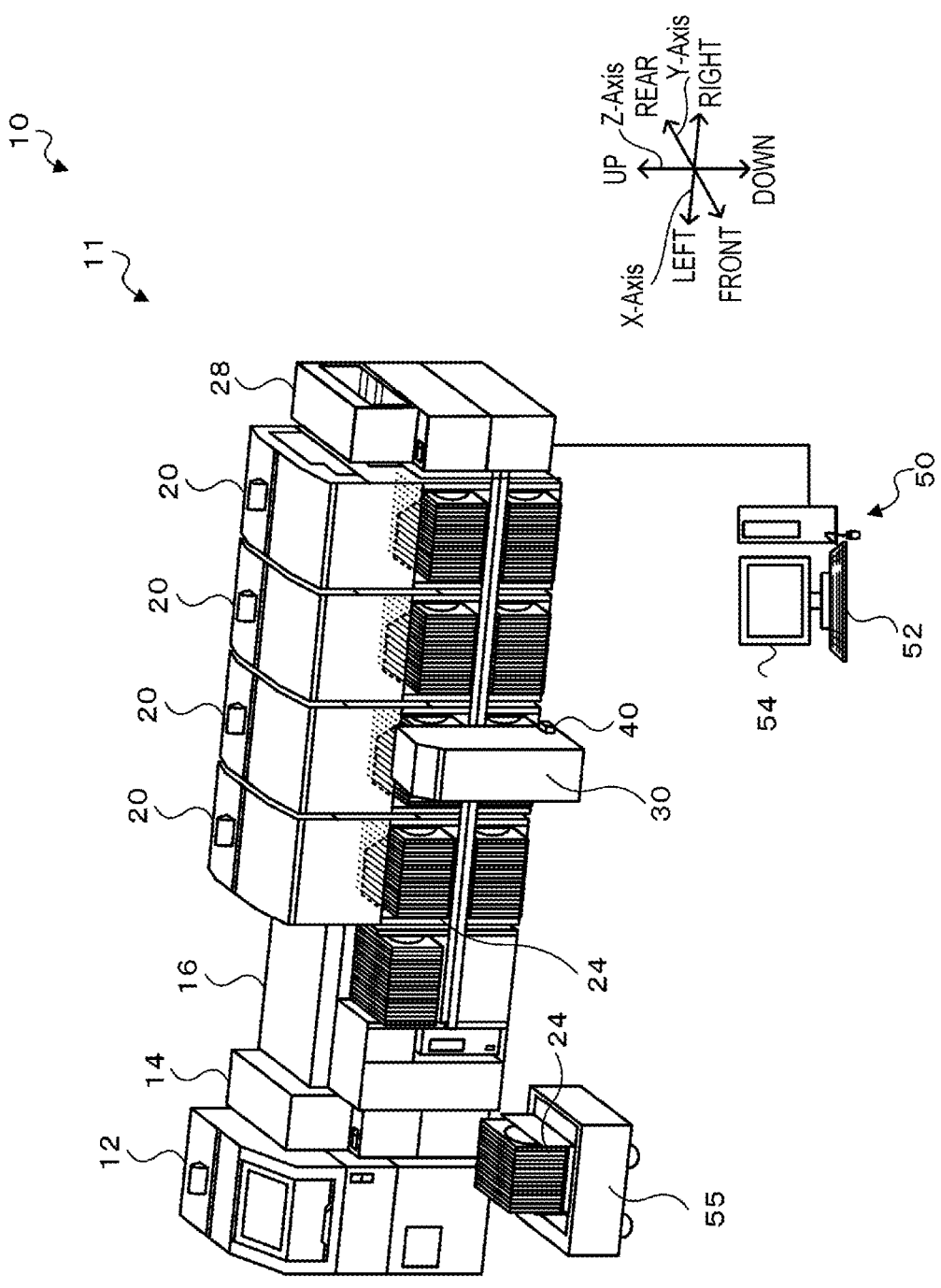
FIG. 2 is an explanatory diagram schematically illustrating a configuration of mounting line 11.
Figure 3:
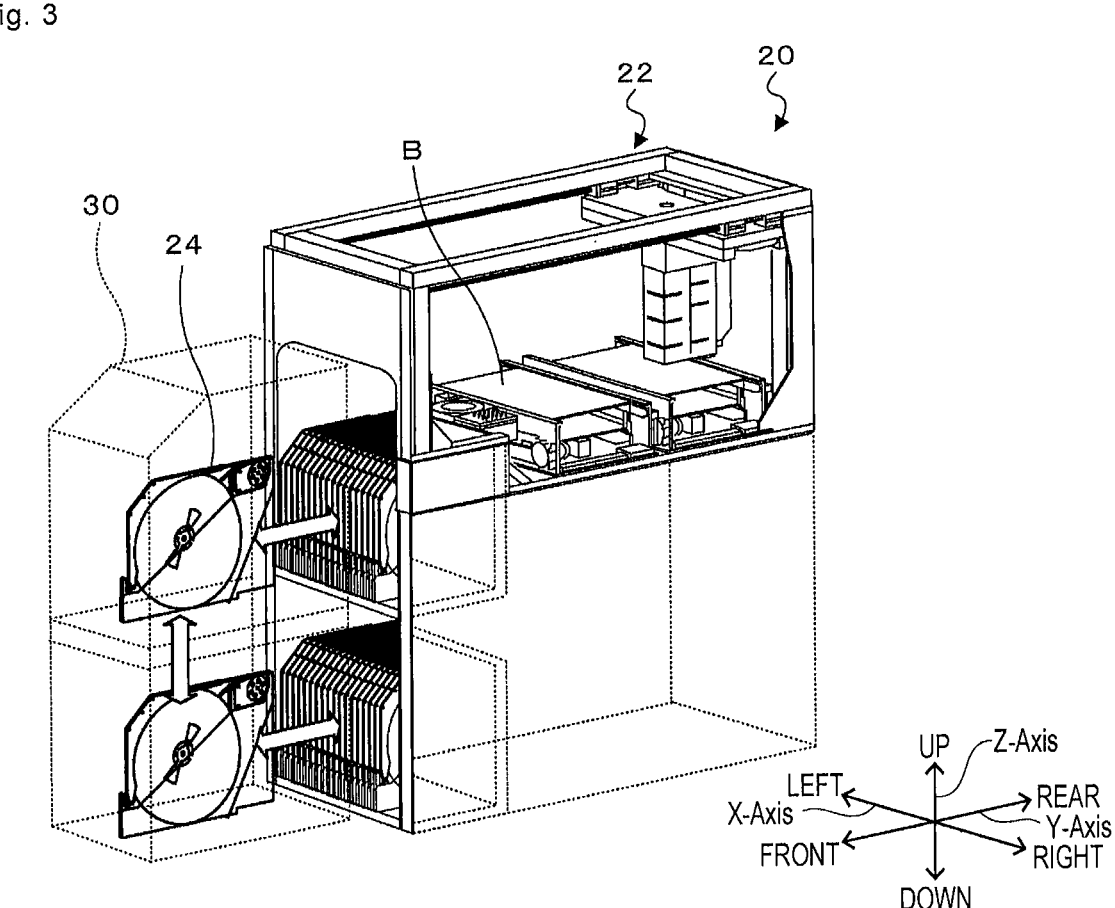
FIG. 3 is an explanatory diagram schematically illustrating a configuration of mounting device 20.
Figure 5:
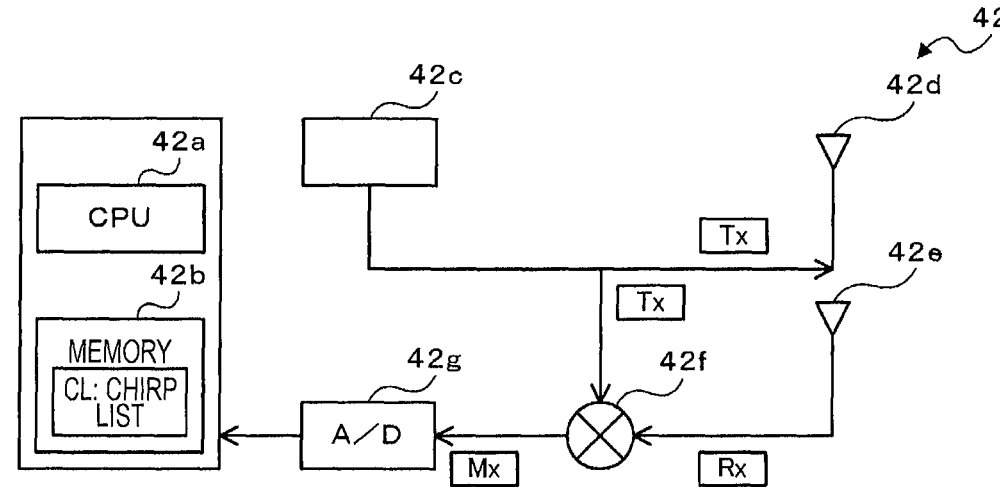
FIG. 5 is an explanatory diagram schematically illustrating a configuration of sensor 42 of sensor system 40.

Embodiments of the present disclosure will be described with reference to accompanying drawings. FIG. 1 is an explanatory diagram illustrating an example of mounting system 10. FIG. 2 is an explanatory diagram schematically illustrating a configuration of mounting line 11. FIG. 3 is an explanatory diagram schematically illustrating a configuration of mounting device 20. FIG. 4 is a block diagram illustrating a configuration related to a control of mounting system 10. FIG. 5 is an explanatory diagram schematically illustrating a configuration of sensor 42 of sensor system 40. In the present embodiment, a left-right direction (an X axis), a front-rear direction (a Y axis), and an up-down direction (a Z axis) are as illustrated in FIGS. 2 and 3.

Mounting system 10 performs a mounting process of a component on board B and includes two mounting lines 11 (11A and 11B) and management device 50. Each mounting line 11 includes, for example, one or more of print device 12, print inspection device 14, storage 16, mounting device 20, and mounting inspection device 28. These are arranged side by side in a conveyance direction (an X-axis direction) of board B. Further, in mounting system 10, loader 30 is disposed on respective mounting lines 11. Respective mounting lines 11 may have the same configuration or different configurations. Further, in each of mounting lines 11, devices are disposed to face each other, and each loader 30 disposed in each of mounting lines 11 moves along a line at intervals where each loader 30 can pass each other.

Print device 12 performs printing on board B (refer to FIG. 3) by pushing solder into pattern holes formed in a screen mask. Print inspection device 14 inspects a state of the solder printed by print device 12. Mounting inspection device 28 inspects a mounting state of a component mounted on board B by mounting device 20. Mounting system 10 may include a reflow device and a reflow inspection device in addition to these. The reflow device melts solder by heating board B on which a component is disposed and then cools the solder, and thereby, each component is electrically connected to board B to be fixed to board B. The reflow inspection device inspects a state of the component on board B after reflow.

Multiple mounting devices 20 are arranged in a conveyance direction of board B and mount components on board B. As illustrated in FIG. 3, mounting device 20 includes mounting unit 22 and feeder 24. Mounting unit 22 is a unit for collecting components and mounting the components on board B by a mounting head on which a collection member such as a nozzle is mounted. Feeder 24 is configured as a tape feeder to which a reel on which a tape holding a component at a predetermined pitch is wound is detachably attached, and feeds out the tape to supply the component by rotating the reel.

Storage 16 is an in-line storage for storing various members used in the mounting process in each mounting line 11, and stores, for example, feeder 24. Worker W replenishes or retrieves feeder 24 in storage 16. Further, loader 30 is capable of automatically exchanging feeder 24 for storage 16. Further, in storage 16, automatic conveyance vehicle 55 (hereinafter, referred to as AGV 55) that automatically conveys a member such as feeder 24 can also replenish or retrieve feeder 24.

Loader 30 includes loader control device 32, loader moving mechanism 34, feeder transferring mechanism 36, and sensor system 40. Loader moving mechanism 34 is configured to move loader 30 in the left-right direction (an X-axis direction) within a movement range (refer to dashed lines in FIG. 1) in a conveyance direction of board B on a front surface side of multiple mounting devices 20 and storage 16. Although not illustrated, feeder transferring mechanism 36 includes a clamp mechanism for clamping feeder 24, a clamp moving device for reciprocating the clamp mechanism in a Y-axis direction (the front-rear direction), and the like, and is configured to transfer feeder 24 between loader 30, mounting device 20, and storage 16. Loader 30 may be configured to automatically exchange a member used in a mounting process, such as a collection member such as a head and a nozzle included in mounting unit 22, an accommodation member for solder, a screen mask, or the like.

Sensor system 40 includes multiple (for example, four) sensors 42 using a frequency modulated continuous wave (FMCW) method for transmitting and receiving a continuous wave of a frequency-modulated chirp signal by using a radio wave. Respective sensors 42 each include a processing section including CPU 42a that performs various types of processing, and memory 42b such as a ROM and a RAM for storing various types of programs and information. Further, in addition to the processing section, each of sensors 42 includes signal generation section 42c, transmission antenna 42d, reception antenna 42e, mixer 42f, AD conversion section 42g, and the like, as illustrated in FIG. 5.

Signal generation section 42c generates and outputs transmission signal Tx (refer to FIG. 6), which is a continuous wave of a chirp signal (reference chirp) frequency-modulated based on a predetermined chirp pattern. Transmission antenna 42d outputs a transmission wave based on transmission signal Tx generated by signal generation section 42c. Reception antenna 42e receives a reflected wave transmitted from transmission antenna 42d and reflected by an object, and outputs reception signal Rx. Mixer 42f receives transmission signal Tx and reception signal Rx to perform mixing, and generates signal Mx based on, for example, a difference between a frequency of transmission signal Tx and a frequency of reception signal Rx and outputs signal Mx. AD conversion section 42g converts signal Mx output from mixer 42f into a digital signal and outputs the digital signal. CPU 42a performs processing such as a fast Fourier transform (FFT) on the digital signal output from AD conversion section 42g, and detects a distance to an object or the like based on a processing result.

In sensor system 40, two sensors 42 are installed on each of the left and right sides of loader 30 such that a predetermined range (four ranges hatched in FIG. 1) in a travel direction (a left direction and a right direction) of loader 30 is a sensing range of each sensor 42. Further, sensor system 40 is configured such that one of four sensors 42 is master M and the remaining three are slaves S1 to S3. Master M recognizes the number (here, four) of sensors 42 in sensor system 40. Further, master M receives detection results from slaves S1 to S3 and outputs the detection results including a detection result of master M to loader control device 32. In the present embodiment, respective sensors 42 (master M and slaves S1 to S3) are set and registered so as to use different chirp patterns from each other, and details thereof will be described below.

Loader control device 32 includes a CPU, a ROM, a RAM, and the like which are well known, and receives detection signals from sensor system 40, a position sensor of loader 30 (not illustrated), and the like, and outputs drive signals to loader moving mechanism 34 and feeder transferring mechanism 36. When feeder 24 is automatically exchanged, loader control device 32 controls loader moving mechanism 34 such that loader 30 moves at a position facing mounting device 20 having feeder 24 to be exchanged as a target position. When loader 30 arrives at the target position, loader control device 32 controls feeder transferring mechanism 36 so as to pull out and retrieve feeder 24 mounted on mounting device 20. Further, loader control device 32 controls feeder transferring mechanism 36 so as to feed out new feeder 24 in loader 30 and mount new feeder 24 on mounting device 20. Further, when an obstruction such as worker W or an object is sensed based on a detection signal of sensor system 40 (each sensor 42) during a travel of loader 30, loader control device 32 controls loader moving mechanism 34 so as to stop the travel until the obstruction is no longer sensed.

Management device 50 is a general-purpose computer configured by a CPU, a ROM, a RAM, an HDD, and the like which are well known, to which input device 52 such as a keyboard or a mouse and output device 54 such as a display are connected. Management device 50 stores a production program of board B and production information related to production of board B in an HDD or the like. The production program defines a mounting sequence of components onto board B, the number of produced boards B, and the like. The production information includes information indicating a print position of solder on board B, information of a component to be mounted on board B, a mounting position of each component, and the like. The information of a component indicates an arrangement state or the like of each mounting device 20 and feeder 24 of storage 16 as an inventory state of components in addition to the type of components to be mounted on each mounting device 20. Further, when board B is produced, management device 50 provides various command signals to print device 12, print inspection device 14, loader 30, mounting device 20, mounting inspection device 28, and the like based on the production program and the production information. Further, management device 50 is configured to enable communication connection with AGV 55 by radio and a travel control of AGV 55 can be performed.

Although not illustrated, AGV 55 includes a motor for rotationally driving wheels, a battery for supplying electric power, and the like, and automatically conveys members such as feeder 24 used in a mounting process to a place or the like between a warehouse (not illustrated) and storage 16. AGV 55, for example, takes out used feeder 24 from storage 16 and automatically conveys feeder 24 to the warehouse and accommodates feeder 24 in the warehouse, or takes out necessary feeder 24 from the warehouse and automatically conveys feeder 24 to storage 16 and accommodates feeder 24 in warehouse 16. AGV 55 may automatically convey a member used in a mounting process in addition to feeder 24.

Figure 6:
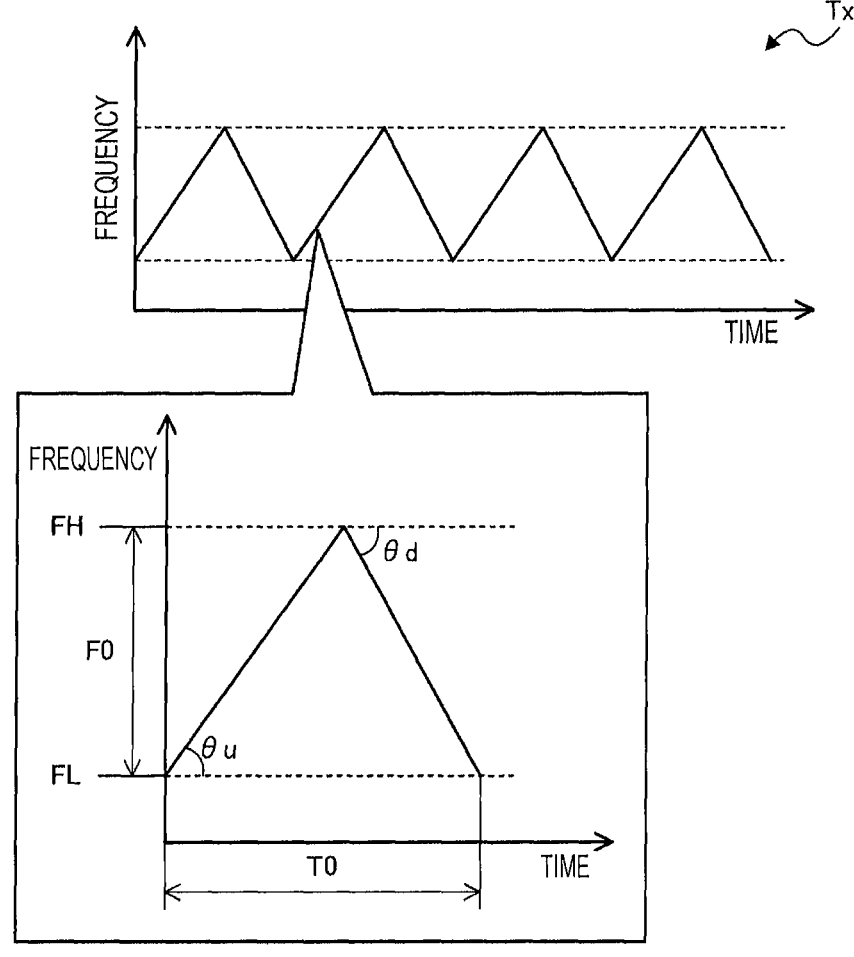
FIG. 6 is an explanatory diagram illustrating an example of transmission signal Tx and a chirp signal.

Next, processing for setting different chirp patterns for respective sensors 42 in sensor system 40 will be described. First, a chirp signal will be described. FIG. 6 is an explanatory diagram illustrating an example of transmission signal Tx and a chirp signal. As illustrated, a chirp signal is determined so as to increase from predetermined frequency FL that is a frequency of a start timing to predetermined frequency FH with inclination θu after lapse of time, decrease with inclination θd after lapse of time when reaching frequency FH, and reach frequency FL at an end timing. A period from the start timing of the chirp signal to the end timing of the chirp signal is defined as chirp time (duration time) T0, and a period from frequency FL to frequency FH is defined as modulation width (bandwidth) F0. In transmission signal Tx, the chirp signal is repeatedly and continuously output.

Figures 7, 8:
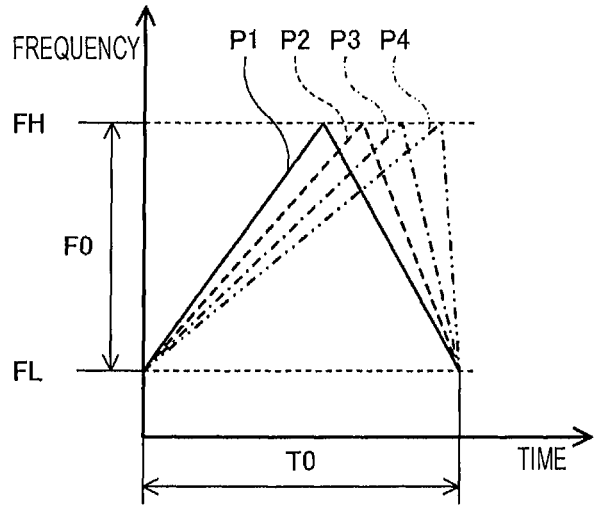
FIG. 7 is an explanatory diagram illustrating an example of chirp list CL.
FIG. 8 is an explanatory diagram illustrating an example of chirp signals having different chirp patterns.

FIG. 7 is an explanatory diagram illustrating an example of chirp list CL. Chirp list CL in FIG. 7 is stored in memory 42b of each sensor 42. Multiple chirp patterns PN (P1, P2, P3, . . . ) to which serial numbers N are assigned are registered in chirp list CL, and different chirp inclinations θ1, θ2, θ3, . . . are determined for each pattern. FIG. 8 is an explanatory diagram illustrating an example of chirp signals having different chirp patterns. In FIG. 8, chirp signals of four chirp patterns P1 to P4 are illustrated by way of an example. Each chirp pattern has a chirp inclination (an angle) θ in which inclination θu (refer to FIG. 6) when increasing from frequency FL is different from inclination θd (refer to FIG. 6) when decreasing from frequency FH. Meanwhile, chirp time T0, frequency FL, frequency FH, and modulation width F0 of the chirp signal are the same for each chirp pattern. Therefore, when inclination θu increasing from frequency FL is determined, inclination θd decreasing from frequency FH is also determined, and thus, for example, increasing inclination θu may be defined and decreasing inclination θd may be defined together therewith, as chirp inclination θ.

Figure 9:
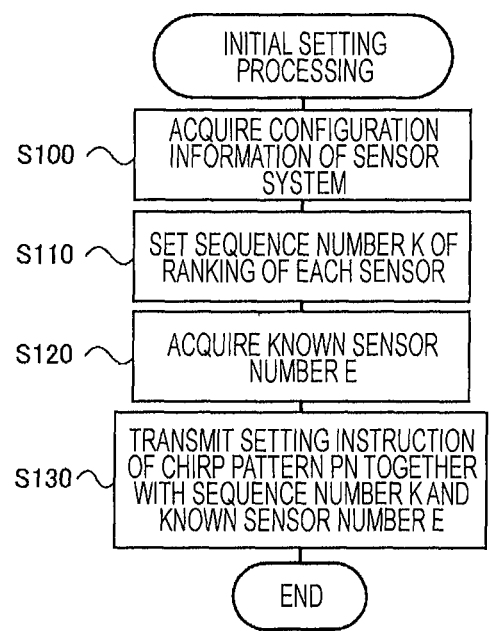
FIG. 9 is a flowchart illustrating an example of initial setting processing.
Figure 10:
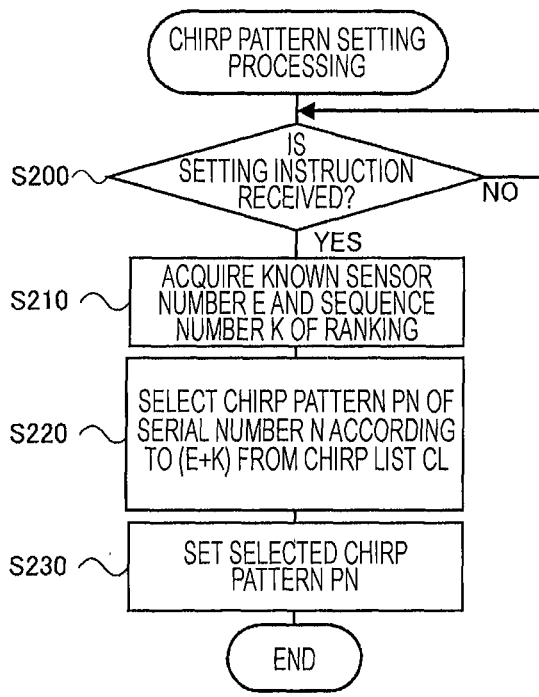
FIG. 10 is a flowchart illustrating an example of chirp pattern setting processing.
Figures 11, 12:
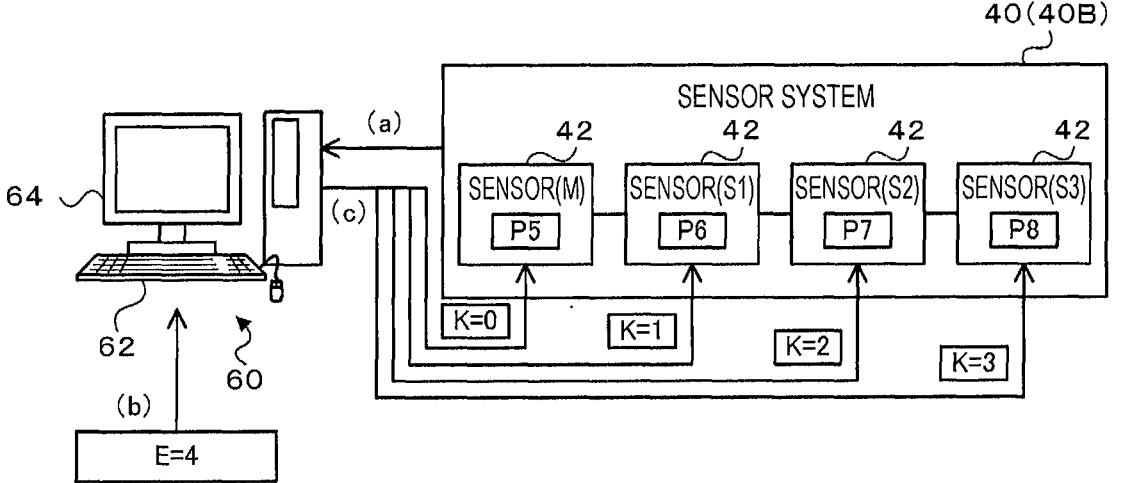
FIG. 11 is an explanatory diagram illustrating how a chirp pattern is set.
FIG. 12 is an explanatory diagram illustrating how a chirp pattern is set.

Next, processing when such respective chirp patterns are set in each sensor 42 will be described. FIG. 9 is a flowchart illustrating an example of initial setting processing, and FIG. 10 is a flowchart illustrating an example of chirp pattern setting processing. FIGS. 11 and 12 are explanatory diagrams illustrating how a chirp pattern is set.

Processing of FIG. 9 is performed by personal computer (PC) 60 (refer to FIGS. 11 and 12). PC 60 is a setting apparatus that is externally connected to sensor system 40 (respective sensors 42) and performs the processing of FIG. 9 in a state where sensor system 40 is connected. PC 60 is configured with a CPU, a ROM, a RAM, an HDD, and the like which are well known and includes input device 62 such as a keyboard or a mouse for inputting various types of information by a worker, and output device 64 such as a display for displaying various types of information.

In the initial setting processing, PC 60 first acquires a system configuration from sensor system 40 (S100, FIG. 11(a) and FIG. 12(a)), and sets ranking of each sensor 42 in sensor system 40 according to whether each sensor 42 is master M or slave S (S110). For example, when sensor system 40 includes four sensors 42 as described above, PC 60 sets a value 0 (zeroth) indicating a head in sequence number K of the ranking of master M, and sets values 1 to 3 (first to third) in sequence number K of the ranking of remaining slaves S1 to S3, respectively.

Next, PC 60 acquires known sensor number E input by worker W through input device 62 (S120, FIG. 11(b) and FIG. 12(b)). For example, in a case where loader 30 of mounting line 11A is installed first in mounting system 10 and loader 30 of mounting line 11B is installed later, when initial setting of sensor system 40A of mounting line 11A is performed first, there are no previously set sensors 42. Therefore, worker W inputs the value 0 as known sensor number E (FIG. 11(b)), and PC 60 acquires the value 0. Further, when the initial setting of sensor system 40b of mounting line 11B is performed later, the initial setting of four sensors 42 of sensor system 40A is previously completed. Therefore, worker W inputs a value 4 as known sensor number E (FIG. 12(b)), and PC 60 acquires the value 4.

Subsequently, PC 60 transmits a setting instruction of a chirp pattern to each sensor 42 together with sequence number K set in S110 and known sensor number E acquired in S120 (S130, FIG. 11(c), and FIG. 12(c)), respectively, and ends the initial setting processing. The present disclosure is not limited to that PC 60 performs each processing of S100 to S120 in this order, such as performing S120 first. Further, PC 60 may transmit sequence number K of the ranking in S110.

Next, processing of each sensor 42 of sensor system 40 will be described. Chirp pattern setting processing of FIG. 10 is performed by CPU 42a of each sensor 42 in a state where sensor system 40 (each sensor 42) is connected to PC 60. In this processing, CPU 42a of sensor 42 first standbys a setting instruction of a chirp pattern to be received from PC 60 (S200). When it is determined that the setting instruction is received, CPU 42a acquires known sensor number E and sequence number K (S210). Although not illustrated, CPU 42a registers, in memory 42b, sequence number K indicating ranking of sensors in sensor system 40 as initial setting of sensor 42.

Subsequently, CPU 42a selects chirp pattern PN having serial number N corresponding to the sum of known sensor number E and sequence number K, from chirp list CL stored in memory 42b (S220). In the present embodiment, serial number N obtained by adding a value 1 to the sum of known sensor number E and sequence number K is selected as serial number N corresponding to the sum of known sensor number E and sequence number K.

As illustrated in FIG. 11, when sensor 42 is master M of sensor system 40A, known sensor number E is a value 0 and sequence number K is a value 0, and thus, chirp pattern P1 having serial number 1 obtained by adding a value 1 to a value 0 of the sum is selected. When sensor 42 is slave S1 of sensor system 40A, known sensor number E is a value 0 and sequence number K is a value 1, and thus, chirp pattern P2 having serial number 2 obtained by adding a value 1 to a value 1 of the sum is selected. Likewise, when sensors 42 are slaves S2 and S3 of sensor system 40A, chirp patterns P3 and P4 are respectively selected.

As illustrated in FIG. 12, when sensor 42 is master M of sensor system 40B, known sensor number E is a value 4 and sequence number K is a value 0, and thus, chirp pattern P5 having serial number 5 obtained by adding a value 1 to a value 4 of the sum is selected. When sensor 42 is slave S1 of sensor system 40B, known sensor number E is a value 4 and sequence number K is a value 1, and thus, chirp pattern P6 having serial number 6 obtained by adding a value 1 to a value 5 of the sum is selected. Likewise, when sensors 42 are slaves S2 and S3 of sensor system 40B, chirp patterns P7 and P8 are respectively selected. In this way, chirp pattern PN in which serial number N in chirp list CL becomes a next number (value 5) of known sensor number E (here, a value 4) corresponds to the head of ranking, and chirp pattern PN having serial number N corresponding to sequence number K of the ranking is selected. When a number 1 is set to master M and numbers 2 to 4 are set to slaves S1 to S3 as sequence number K of the ranking, serial number N that is the same as the sum of known sensor number E and sequence number K of the ranking may be selected as it is.

Then, CPU 42a sets selected chirp pattern PN as self-chirp pattern (S230) and ends the chirp pattern setting processing. Thereby, chirp patterns PN having different chirp inclinations θ are automatically assigned to and registered in each sensor 42. Therefore, even when sensor 42 receives a reflected wave transmitted from another sensor 42 and reflected, appropriate signal Mx cannot be generated from mixing of reception signal Rx and self-transmission signal Tx. Thus, sensor 42 can prevent erroneous detection based on reflected waves from other sensors 42, and thus, detection accuracy can be improved. Even when chirp signals have different chirp inclinations θ, there is a range in which frequencies are similar to each other such as the vicinity of frequency FL (refer to FIG. 8), but detection processing can be performed appropriately by excluding the range of frequency in the detection processing.

A correspondence relationship between constituent elements of the present embodiment and constituent elements of the present disclosure will be clarified. Sensor system 40 of the present embodiment corresponds to a sensor system of the present disclosure, memory 42b of each sensor 42 corresponds to a storage section, and CPU 42a of each sensor 42 that performs chirp pattern setting processing corresponds to a setting section.

In sensor system 40 in mounting system 10 described above, different chirp pattern PN for each sensor 42 is selected from multiple chirp patterns PN and set in association with sensor 42. Therefore, worker W need not select and set chirp pattern PN for each sensor 42, and thus, a setting work of sensor system 40 can be easily performed. Further, each sensor 42 transmits and receives a radio wave based on a chirp signal of the different chirp pattern PN, and thus, a possibility of radio wave interference can be reduced. Thus, radio wave interference between multiple sensors 42 can be easily prevented, and thereby, normal detection result can be obtained from each sensor 42.

Since modulation width F0 and chirp time T0 of frequencies having different chirp inclinations θ are common in multiple chirp patterns PN, complicated setting such as changing detection processing for each sensor 42 need not be performed, and thus, it is possible to more easily prevent radio wave interference.

Chirp pattern PN of which serial number N becomes the next number of the known sensor number E (setting number) in chirp list CL is set to correspond to the head of ranking, and chirp pattern PN having serial number N corresponding to sequence number K of the ranking is selected. Therefore, even when setting of new sensor 42 is performed in a state where there is previously set sensor 42 (refer to FIG. 12), different chirp pattern PN for each sensor 42 can be appropriately set by simple processing.

In sensor system 40, known sensor number E and sequence number K of the ranking are acquired from PC 60 at the time of initial setting of sensor 42, and setting of chirp pattern PN are collectively performed at the time of initial setting, and thus, it is possible to prevent the setting time from increasing.

Each sensor 42 has a common configuration, and the same setting processing is performed for each sensor 42 to set chirp pattern PN, and thus, a configuration of sensor system 40 can be prevented from being complicated.

It is to be understood that the present disclosure is not limited to the embodiments described above in any way and may be implemented in various forms as long as the embodiments belong to the technical scope of the present disclosure.

For example, in the above-described embodiments, each of multiple sensors 42 includes CPU 42a and memory 42b and selects and sets self-chirp pattern PN; however, the configuration is not limited to this. For example, sensor system 40 may include a setting section and a storage section to select chirp pattern PN different from each sensor 42 from multiple chirp patterns PN and cause each sensor 42 to set selected chirp pattern PN.

In the above-described embodiments, known sensor number E and sequence number K of the ranking are acquired from PC 60 at the time of initial setting of sensor 42 to set chirp pattern PN, but the present disclosure is not limited thereto, and chirp pattern PN may be set at a timing different from the time of initial setting. Further, although PC 60 acquires known sensor number E by an input from worker W, known sensor number E may be stored in a RAM, an HDD, or the like when initial setting processing is performed, and then known sensor number E may be read to be acquired when the initial setting processing is performed. Further, PC 60 is exemplified as a setting apparatus that can be externally connected to sensor system 40 but is not limited thereto and may be used as management device 50 or the like or may be used as a dedicated setting apparatus.

In the embodiment, chirp pattern PN is selected by using chirp list CL to which serial numbers are assigned to multiple chirp patterns PN, but the present disclosure is not limited to using chirp list CL. For example, selected chirp pattern PN and unselected chirp pattern PN may be distinguishable from each other, and any one of chirp patterns PN may be appropriately selected from unselected chirp patterns PN. Further, chirp pattern PN is not limited to selecting in the order of serial numbers and may be in a random order or may be randomly selected by lottery or the like.

In the embodiment, multiple chirp patterns PN each have different chirp inclinations θ, but the present disclosure is not limited to this, and any one or more of chirp inclination θ, modulation width F0 of a frequency, and chirp time T0 may be different. Further, a pattern may be used in which frequency FL and frequency FH are offset so as to be different from each other without changing modulation width F0. Alternatively, a pattern or the like may be used in which waveform shapes of frequencies of chirp signals are different from each other.

In the embodiment, a configuration is exemplified in which sensor system 40 is used for loader 30 of mounting system 10, but the present disclosure is not limited thereto, and sensor system 40 may be used for another mobile object such as AGV 55 or may be used for various work robots other than mounting system 10.

A sensor system of the present disclosure may be configured as follows. For example, in the sensor system of the present disclosure, the storage section may store, as the multiple chirp patterns, patterns in which modulation widths of frequencies and times of the chirp signals are common and modulation inclinations are different from each other. Accordingly, since modulation widths of frequencies and times of chirp signals are different from each other, there is no need to perform complicated works such as changing content of detection processing for each sensor, and thus, it is possible to more easily prevent radio wave interference between multiple sensors.

In the sensor system of the present disclosure, the storage section may store a chirp list in which serial numbers are assigned to the multiple chirp patterns, and the setting section may acquire a setting number of the chirp patterns that are previously set in the sensor and information on ranking of the sensors in the sensor system, cause the chirp pattern having the serial number next to the setting number in the chirp list to correspond to a head of the ranking, and select and set the chirp pattern having the serial number according to a sequence number of the ranking. Accordingly, even when a sensor is added in a state where there is a chirp pattern previously set to the sensor, a different chirp pattern for each sensor can be appropriately set by simple processing. Further, when a sensor system is introduced for the first time, a setting number of a chirp pattern is set to a value 0, and thus, the chirp pattern can be set by common processing.

In the sensor system of the present disclosure, the ranking of each of the multiple sensors, based on whether the multiple sensors are one master in the sensor system or slaves other than the master, may be determined in initial setting using an externally connected setting apparatus, and the setting section may acquire the information from the setting apparatus at the time of the initial setting. Accordingly, setting of a chirp pattern can be performed efficiently and collectively at the time of initial setting.

In the sensor system of the present disclosure, each of the multiple sensors may include the storage section and the setting section, and the setting section may select and set the chirp pattern for the sensor of the setting section. Accordingly, each sensor has a common configuration, and the same setting processing may be performed for each sensor to set a chirp pattern, and thus, a configuration and setting processing of sensor system can be prevented from being complicated.

INDUSTRIAL APPLICABILITY

The present disclosure can be used for a sensor system including multiple sensors of an FMCW method, or the like.

REFERENCE SIGNS LIST

10: mounting system, 11,11A,11B: mounting line, 12: print device, 14: print inspection device, 16: storage, 20: mounting device, 22: mounting unit, 24: feeder, 28: mounting inspection device, 30: loader, 32: loader control device, 34: loader moving mechanism, 40: sensor system, 42: sensor, 42a: CPU, 42b: memory, 42c: signal generation section, 42d: transmission antenna, 42e: reception antenna, 42f: mixer, 42g: AD conversion section, 50: management device, 52: input device, 54: output device, 55: automatic conveyance vehicle (AGV), 60: personal computer (PC), 62: input device, 64: output device, B: board, W: worker.

The invention claimed is:

1. A sensor system, comprising:

a loader configured to move along a mounting line within a movement range and to exchange a feeder that contains components for mounting;

multiple sensors of the loader configured to transmit and receive continuous waves of frequency-modulated chirp signals by using radio waves to determine a distance to an object, the multiple sensors including a master sensor and slave sensors, the master sensor sending and receiving detection results of the master sensor and the slave sensors;

a storage section configured to store multiple chirp patterns having different patterns of the chirp signals; and a setting section configured to acquire a number of the multiple sensors that have been previously configured with one of the patterns of the chirp signals, acquire a ranking of the multiple sensors in the sensor system, the ranking based on the master sensor set to a rank 0 and each of the slave sensors ranked sequentially from the rank 0, and select a different chirp pattern for each sensor from the multiple chirp patterns in accordance to a sequence of the number plus the ranking and set the selected chirp pattern in association with the sensor.

2. The sensor system according to claim 1, wherein the storage section stores, as the multiple chirp patterns, patterns in which modulation widths of frequencies and times of the chirp signals are common and modulation inclinations are different from each other.

3. The sensor system according to claim 1, wherein the storage section stores a chirp list in which serial numbers are assigned to the multiple chirp patterns, and the setting section acquires a serial number corresponding to the number plus the ranking in the chirp list to correspond to a head of the ranking, and sets the chirp pattern having a serial number according to the sequence.

4. The sensor system according to claim 3, wherein the ranking is determined in an initial setting using an externally connected setting apparatus, and the setting section acquires the ranking from the setting apparatus at time of the initial setting.

5. The sensor system according to claim 1, wherein each of the multiple sensors includes the storage section and the setting section, and the setting section selects and sets the chirp pattern for the sensor of the setting section.

* * * * *